Nov. 25, 1952  G. B. WATKINS  2,618,959
STRUCTURAL GLASS ARTICLE
Filed April 24, 1948

Inventor
GEORGE B. WATKINS.
By Frank Graver
Attorney

Patented Nov. 25, 1952

2,618,959

UNITED STATES PATENT OFFICE 2,618,959

STRUCTURAL GLASS ARTICLE

George B. Watkins, Toledo, Ohio, assignor to Libbey-Owens-Ford Glass Company, Toledo, Ohio, a corporation of Ohio Application April 24, 1948, Serial No. 23,095

4 Claims. (Cl. 72—35)

The present invention relates to structural glass or similar vitreous material, to the backing or mounting thereof, and to a special adhesive material for this purpose.

It is a continuation in part of my copending application Serial No. 608,165, filed August 1, 1945, now abandoned.

In the past, considerable difficulty has been encountered in satisfactorily and permanently mounting structural glass panels such as Vitrolite, for example, on walls and other surfaces. For one thing, the individual panels of this structural glass are usually of much greater area than are individual pieces of ceramic tile or similar competitive wall facing materials, and involve a great deal more weight that has to be supported.

Then too, the mastics that have been commonly used to back or secure such facing panels in place expand and contract under the influence of varying temperature conditions. This expansion and contraction is considerable and more or less continuous during normal use of the facing, especially in the case of building exteriors. Consequently, a correspondingly severe and continual strain is exerted on the bond between the glass and mastic, and between the mastic and the wall, which strain frequently results in breaking of the bond, or cracking of the panel itself, or both. Moreover, when the mastic used contains solvents, as is usually the case, their evaporation leads to additional shrinkage, let-go areas, and a general decrease in adhesion.

According to this invention, a special kind of adhesive backing is employed in a manner calculated to overcome all of these former difficulties.

Briefly stated, the new backing material is a cold setting, "Thiokol" base, synthetic resin adhesive which, in addition to other desirable properties, has remarkable adherence to glass when used either as a backing alone or as a means for securing the surface of a glass article or panel to another surface.

An important object of the invention is the provision of an adhesive of the above character, for backing, mounting or securing articles to structural glass, that is a 100% solids material and so substantially free from solvents; that is stable, ductile, elastic, resistant to weathering and chemical attack; and which exhibits practically no expansion or shrinkage under changing temperature conditions.

Another object is to provide a method of backing structural glass slabs, panels or other articles in a manner to increase their resistance to fracture from shocks or blows, and to reduce breakage due to handling, mounting, etc., to a minimum.

A further object is the provision of a method of mounting slabs and panels, as a facing on a wall or the like, quickly, simply, efficiently and economically, without any special preparation of the supporting wall or surface, and without the necessity of using heavy loads of mortar or thick masses or gobs of plastic.

Still another object is to provide a method or procedure for securing mountings, fixtures, or the like to structural glass surfaces in a neat and efficient manner without the use of mechanical fastening means.

Further objects and advantages of the invention will become more apparent during the course of the following description when taken in connection with the accompanying drawings.

In the drawings wherein like numerals are employed to designate like parts throughout the same:

Figure 1:
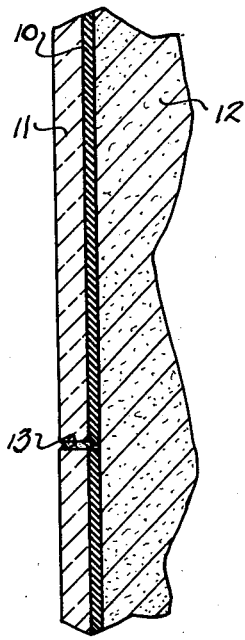
Fig. 1 is a fragmentary sectional view showing one way of mounting a glass slab or facing panel on a wall in accordance with the invention.

As pointed out above, the adhesive backing material employed in this invention has a "Thiokol" base. Generally speaking, "Thiokol" is an olefin polysulphide type of synthetic resin; or, differently stated, it is a reaction product obtained from the interaction of an olefin halide, such as ethylene dichloride, and an alkali or alkaline earth sulfide. Some types of "Thiokol" may be made from other organic dihalides such as glycerol dichlorohydrin or dichlorodiethyl ether. However, I prefer to use a partially polymerized or cured Thiokol such as that manufactured by the Thiokol Corporation of Trenton, New Jersey, as type L. P. 2.

This particular type of "Thiokol" is a polyfunctional mercaptan, the —SH terminals of which are extremely reactive. It can be purchased as a viscous liquid about 400 poises in viscosity at 25° C., and can be readily polymerized to a firm, resilient, rubber-like material. Although free of solvents, it can be applied as a liquid in places inaccessible to usual rubber-like materials and converted in place with little, if any, shrinkage. The average structure of the material is as follows:

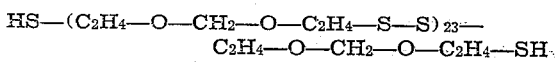

Occasionally in the chain of reoccurring units there is a side mercaptan group.

For the present purpose, this poly-functional mercaptan, partially polymerized, is compounded with carbon black and other waxes and resins to give it body. Up to this point the resultant material will have many desirable properties, but its adhesion to glass is relatively poor. However, by further compounding it with a Bakelite type of resin, a substance having really remarkable properties of adhesion, not only to glass but to other materials as well, is obtained.

Specifically, I prefer to use a thermosetting phenol formaldehyde in the liquid state as the Bakelite type resin, and vary the proportions of the several materials to suit the degree of viscosity, adhesion and so forth that is desired for the particular job at hand. For all around use, I have found a compound or mixture that has a consistency approximating that of fibrous grease, at ordinary temperatures, to be the best.

For example, a mixture of from 55% to 60% of poly-functional mercaptan, 10% to 15% of liquid phenol formaldehyde, and approximately 30% carbon black gives a mix of this generally desirable consistency. These amounts may of course be varied where different consistencies are preferred, but it is always desired to maintain a preponderance of the poly-functional mercaptan in the mix.

An appropriate length of time before the material is to be applied, it must be mixed with an accelerator. For example, lead peroxide that has been finely ground and suspended in or preferably just wetted with an organic liquid such as toluene or xylene is very satisfactory. Without the addition of the accelerator the compound will not set up or harden, even after extended exposure to the atmosphere, but by using the proper amount of accelerator it can be made to set up cold in whatever time is desired. However, care should be used not to employ too much accelerator because amounts above 15% tend to decrease the adhesion of the material.

I prefer to mix 15 parts of accelerator with 100 parts of the mercaptan-filler-thermosetting resin compound. This mixture is workable on a putty knife for about one hour at ordinary temperatures and sets to a tack-free rubber-like material in approximately four hours.

In facing walls with vitrolite slabs as shown in Fig. 1 of the drawings, for instance, a batch of the compound after being properly mixed with the accelerator is applied in a relatively thin uniform coating 10 to the back of a structural glass slab 11, and the backed or coated side of the slab is then pressed into place against the wall 12 to be faced. The special adhesive backing material adheres tightly to plaster, masonry or practically any other kind of wall surface, and no preparatory work need be done on the wall prior to the application of the glass facing.

In setting large panels of this type with ordinary mastics, it is customary to provide some sort of support for the panels until the mastic has hardened. Such a supporting means can be used here too, but the adhesive of this invention will support the panel unaided in approximately one hour's time. Within this period, although it has not become tack-free, the material will have set to such a degree that its adhesion and body are sufficiently strong to prevent any movement of the vitrolite block or slab.

As an alternate method of mounting, the slabs 11 may be prebacked at the factory, with a thinner coating of adhesive backing than is shown at 10 in Fig. 1, dried, and the backed slabs then shipped to the place where they are to be installed. In this case a second thin coating of the material is applied on the job and the panels then mounted onto the wall in the manner outlined above. Since the adhesive backing sticks as well to itself as it does to glass, a mounting can be obtained by this method that is just as satisfactory as the other. The advantage of the second method is that the prebacked glass slab is considerably more resistant to breakage than an unbacked one and consequently can be shipped and handled with less risk. Moreover, in the case of a prebacked panel, it is possible to utilize a thinner glass plate, which will be both cheaper to produce and lighter in weight. Regardless of whether plain or prebacked slabs are employed, the four edges of each should be buttered with a suitable joint cement 13 before setting them in place.

Figure 2:
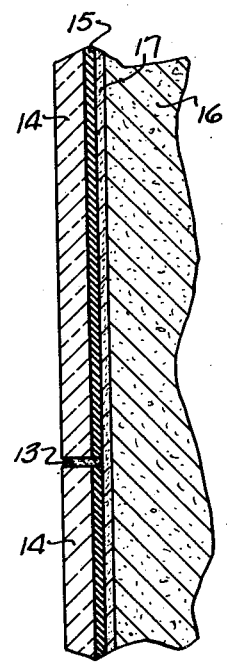
Fig. 2 is a similar view showing an alternate way of mounting the slabs or panels.

Instead of applying the adhesive backing to the tile itself, as described in the two methods above, equally good results can be obtained by troweling the material directly onto the wall, or onto both the tile and the wall. However, effective adhesion cannot be obtained if the material is applied to a moist surface. Nevertheless, a structural glass slab that has been prebacked with the adhesive of the invention, and the material then allowed to set up, can be satisfactorily mounted on a wall by either a wet flow coat or with an application of regular plaster, as indicated in Fig. 2 of the drawings.

As there shown, a slab 14 which has been prebacked at the factory with a layer of the adhesive backing 15 is secured to a wall 16 by a float coat 17 which is preferably a wet cement and sand mix. Alternatively, the same result can be had by using plaster of Paris, or Portland cement mortar in place of the float coat at 17. A very excellent bond is obtained in this manner, but even better results are gained by using a prebacked tile in which dry plaster has been embedded in the exposed face of the layer 15. This is preferably accomplished by sprinkling the plaster onto the layer of backing material while it is setting up at the factory.

Figure 3:
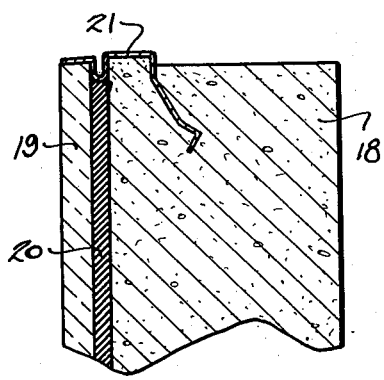
Fig. 3 is a fragmentary section through a "Glastone" type of load bearing building block wherein the Vitrolite panel is secured to the cementitious backing by my invention.

In Fig. 3 there has been illustrated the manner in which the present invention may be employed to secure the ornamental glass facings to socalled Glastone blocks. These blocks are a load bearing type of cementitious building unit comprising a backing portion 18 to the front face of which is secured an opaque glass or vitrolite covering 19, by means of an adhesive 20 and metal edge holders 21. The exact construction of these blocks and the preferred method of making them is described in detail in the patent to Erle T. Putnam, No. 2,235,114, issued March 18, 1941, and the same procedure is followed in the present instance, except that the special adhesive backing of this invention is substituted for the asphaltic mastic cement of Putnam.

The particular compound of poly-functional mercaptan, filler materials, and thermosetting resin, when mixed with an accelerator as described here, has proved in actual tests to be unusually satisfactory in mounting structural glass facings onto walls with any and all of the methods set forth above. In addition to the permanency and stability of its adhesive properties, the mixture has the advantage of being a 100% solids material, or more clearly expressed, a substantially solvent-free mix. Consequently, there are no solvents to evaporate and cause shrinkage and to set up other conditions detrimental to adhesion. As an adhesive or backing it is practically impervious to weathering because it resists attacks from moisture and ultraviolet light, and exhibits little or no expansion and contraction at high or low temperatures. At the same time it is sufficiently resilient to compensate for any slight movement that may occur between the glass facing and the main body of the wall. It also successfully resists most of the other things by which this type of structure may be attacked, i. e., oils, weak acids, bases, etc.

Figure 4:
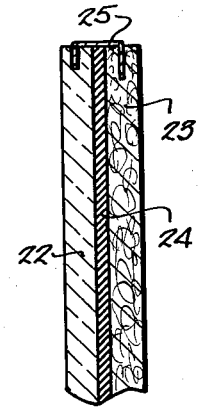
Fig. 4 is a fragmentary sectional view of a structural glass tile provided with a fiberboard or similar type backing secured thereto according to this invention.

In addition to functioning as a backing by itself, this material is also valuable in securing other backing materials to glass panels or the like as shown in Fig. 4. The unit shown there comprises a vitrolite or similar slab 22 adhered to a backing of insulating or similar board 23 by a layer of the adhesive backing material 24. Suitable mechanical fasteners 25 may also be used if desired, or required by the building codes. Units of this character may be used for a variety of different purposes such as facing panels, counter or table tops, partitions, and so forth.

Figure 5:
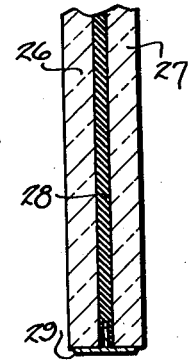
Fig. 5 is a fragmentary sectional view of a laminated or double faced structural glass panel of the sort used in toilet stalls and partitions, with the two glass plates of the composite unit being joined together by the adhesive backing of the invention.

Another type of unit that may be used in much the same way is shown in Fig. 5. This one is made up of two plates of opaque structural glass 26 and 27 secured together in face to face relation by a layer of the special adhesive material 28, and provided with a metal edging 29 extending around the periphery of the composite slab. This particular unit has proved to be extremely satisfactory for use in stiles and partitions in toilet stalls. Still another kind of unit that can be used in this same way can be produced by providing the unit of Fig. 4 with a second glass panel 22 secured to the opposite side of the board 23 by a second layer of the adhesive 24.

In this connection, the special adhesive backing has been found to adhere glass tightly to plywood, plaster, glass, paper and painted surfaces; and to cardboard, transite, steel, brass, cloth, brick, stone, and to the hardened surface of the material itself. Conversely, it will adhere any of these materials to glass, and under test conditions the bond between the particular material tested and the glass appeared to be as strong and as stable as the material itself.

Figure 6:
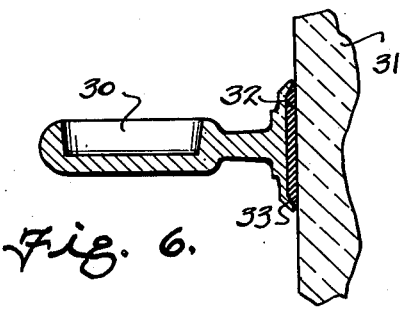
Fig. 6 is a view showing a bathroom fixture secured to a glass wall by the same material.

In Fig. 6 there has been illustrated the method by which kitchen, bathroom and mirror fixtures can be mounted onto the panel or tiles of a wall by means of this same backing material. In the drawing, a glass holder 30 is pictured as secured to a glass wall panel 31 with a layer of the adhesive 32 alone. The fixture 30 may be of either metal or porcelain and is preferably provided with a flange 33 so as to conceal the backing material. So solid and permanent a mounting does this provide that no unsightly screws, supporting brackets or other mechanical supporting means need be employed, and the installation has the added advantage of eliminating any necessity for drilling or cutting into the glass panel.

Figure 7:
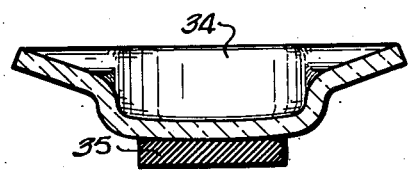
Fig. 7 is a vertical section through an ash tray made of structural glass and provided with a base of my special backing material.

Fig. 7 illustrates another way in which the material may be employed as a backing for a glass article. In this case an ash tray 34 has been molded or pressed from a piece of structural glass and has then been provided with a base 35 of the special adhesive backing. The backing or base is applied to the ash tray in the same manner that the prebacking was applied to the panels 11 and 14 of Figs. 1 and 2, and sets up into a smooth, resilient, rubber-like standard or base that is non-tacky but will not slip or slide on smooth surfaces.

It is believed that many other ways in which the adhesive material of this invention can be employed in the backing or mounting of structural glass will be apparent from the above, and it is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A structural glass article and an adhesive backing on one surface thereof comprising a substantially solvent free mixture including essentially 55 to 60% of a partially polymerized poly-functional mercaptan resulting from the reaction of an olefin halide with an alkaline earth sulphide and having substantially the following structure:

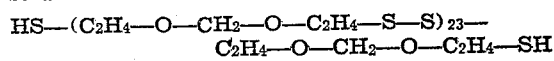

10 to 15% of thermosetting phenol formaldehyde in liquid form, approximately 30% carbon black, and less than 15% of an accelerator to the total percentage of mercaptan, formaldehyde and carbon black.

2. A laminated panel comprising two sheets of material at least one of which is glass, and an interposed layer of a substantially solvent free mixture including essentially 55 to 60% of a partially polymerized poly-functional mercaptan resulting from the reaction of an olefin halide with an alkaline earth sulphide and having substantially the following structure:

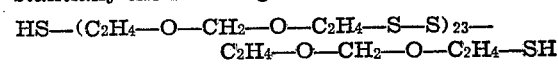

10 to 15% of thermosetting phenol formaldehyde in liquid form, approximately 30% carbon black, and less than 15% of an accelerator to the total precentage of mercaptan, formaldehyde and carbon black, all bonded together into a composite unit by polymerization of the interposed layer.

3. A building block comprising, a cementitious body portion, a structural glass face plate covering one surface of said body portion, and a layer of a substantially solvent free mixture including essentially 55 to 60% of a partially polymerized poly-functional mercaptan resulting from the reaction of an olefin halide with an alkaline earth sulphide and having substantially the following structure:

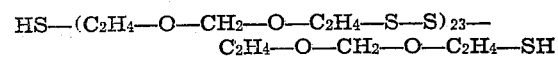

10 to 15% of thermosetting phenol formaldehyde in liquid form, approximately 30% carbon black, and less than 15% of an accelerator to the total percentage of mercaptan, formaldehyde and carbon black lying between said face plate and said body portion and securing the former to the latter.

4. A glass wall panel having a fixture projecting outwardly therefrom, and a layer of a substantially solvent free mixture including essentially 55 to 60% of a partially polymerized polyfunctional mercaptan resulting from the reaction of an olefin halide with an alkaline earth sulphide and having substantially the following structure:

$$HS-(C_2H_4-O-CH_2-O-C_2H_4-S-S)_{23}-C_2H_4-O-CH_2-O-C_2H_4-SH$$

10 to 15% of thermosetting phenol formaldehyde in liquid form, approximately 30% carbon black, and less than 15% of an accelerator securing said fixture to said panel.

GEORGE B. WATKINS.

REFERENCES CITED

The following references are of record in the file of this patent:

UNITED STATES PATENTS

| Number | Name | Date |
| --- | --- | --- |
| 2,206,643 | Patrick | July 2, 1940 |
| 2,394,375 | Gross | Feb. 5, 1946 |
| 2,466,963 | Patrick et al. | Apr. 12, 1949 |

FOREIGN PATENTS

| Number | Country | Date |
| --- | --- | --- |
| 466,159 | Great Britain | May 13, 1937 |
| 48,977 | France | June 28, 1938 |
| (1st addition to 804,552) | | |

OTHER REFERENCES

Fiedler, Canadian Chemistry and Process Industries, August 1944, pages 531–533.

Martin, pages 1144, 1145 and 1149, Ind. and Eng. Chem., October 1936.

"Report on Adhesion Studies LP-2 Compounds to Aluminum," LP-2-46.1, 7 pages, April 8, 1947, Thiokol Corp.

"Thiokol Liquid Polymer LP-2," pages 1 and 16–18, published October 13, 1947, by Thiokol Corp.